(12) United States Patent
Chou

(10) Patent No.: US 8,169,403 B2
(45) Date of Patent: May 1, 2012

(54) IMAGE PROCESSING APPARATUS

(75) Inventor: Chih-Rong Chou, Hsinchu (TW)

(73) Assignee: Aiptek International Inc. (TW)

( * ) Notice: Subject to any disclaimer, the term of this patent is extended or adjusted under 35 U.S.C. 154(b) by 881 days.

(21) Appl. No.: 12/286,265

(22) Filed: Sep. 29, 2008

(65) Prior Publication Data

US 2009/0195519 A1    Aug. 6, 2009

(30) Foreign Application Priority Data

Feb. 4, 2008 (TW) .............................. 97202385 U

(51) Int. Cl.
*G06F 3/033* (2006.01)
*G09G 5/08* (2006.01)
(52) U.S. Cl. .................. 345/157; 345/163; 345/184
(58) Field of Classification Search .................. 345/157, 345/169, 159, 160, 167, 184, 163; 463/37, 463/38
See application file for complete search history.

(56) References Cited

U.S. PATENT DOCUMENTS

| 7,061,471 B2 * | 6/2006 | Bohn | 345/163 |
| 7,283,124 B2 * | 10/2007 | Pai | 345/167 |
| 7,671,845 B2 * | 3/2010 | Keely | 345/169 |
| 7,876,306 B2 * | 1/2011 | Chiang | 345/163 |

* cited by examiner

*Primary Examiner* — Nabil Hindi

(57) ABSTRACT

An image processing apparatus comprises a display module, a control module and a scroll wheel module. The display module is used to display a digital image. The control module is connected to the display module for controlling the display module and conducting image processing. The scroll wheel module is connected to the control module for providing at least five operation modes, each in a different direction, and generating at least five control signals for controlling the control module to conduct image processing.

12 Claims, 6 Drawing Sheets

IMAGE PROCESSING APPARATUS

BACKGROUND OF INVENTION

1. Field of the Invention

The present invention relates to an image processing apparatus and, more particularly, to an image processing apparatus in which a scroll wheel is used in combination with a plurality of touch switches to generate control signals having different functions, thereby reducing an amount of operation keys on the image processing apparatus.

2. Description of the Prior Art

With rapid advancement of digitization technologies, traditional image processing has entered a new digital era and conventional image processing apparatuses have evolved accordingly, so that a new generation of products has been created for storing and recording digital images. These fashionable digital audio/video products include, for instance, digital video cameras, digital still cameras and digital frames.

However, in order to allow for the operation of a plurality of functions, a conventional image processing apparatus must be installed with a plurality of corresponding function keys, which inevitably take up a certain percentage of a volume of the apparatus and therefore prevent the apparatus from being further downsized. Thus, the resulting image processing apparatus becomes even more difficult to operate because of its bulky size and considerable weight. Furthermore, the plural function keys require a great number of components, which increase not only the difficulty and fraction defective in assembly but also the cost.

Therefore, it has been an important issue in relevant industries to reduce the number of function keys on a conventional image processing apparatus, to replace the conventional function keys with a minimum number of operating elements, to significantly reduce the weight of the apparatus, to further lower the material cost and volume of the apparatus, and to allow the apparatus to be more conveniently operated.

SUMMARY OF INVENTION

A primary objective of the present invention is to provide an image processing apparatus which comprises a scroll wheel module capable of generating at least five control signals, allowing operation in five different directions, and reducing an amount of function keys on the image processing apparatus.

In order to achieve the aforementioned objectives, the present invention discloses an image processing apparatus which comprises a display module, a control module and a scroll wheel module. The display module is used to display a digital image. The control module is connected to the display module for controlling the display module and conducting image processing. The scroll wheel module is connected to the control module for providing at least five operation modes, each in a different direction, and generating at least five control signals for controlling the control module to conduct image processing.

BRIEF DESCRIPTION OF THE DRAWINGS

The present invention as well as a preferred mode of use, further objectives and advantages thereof will best be understood by reference to the following detailed description of illustrative embodiments when read in conjunction with the accompanying drawings, wherein.

DETAILED DESCRIPTION OF THE PREFERRED EMBODIMENT

Figure 1:
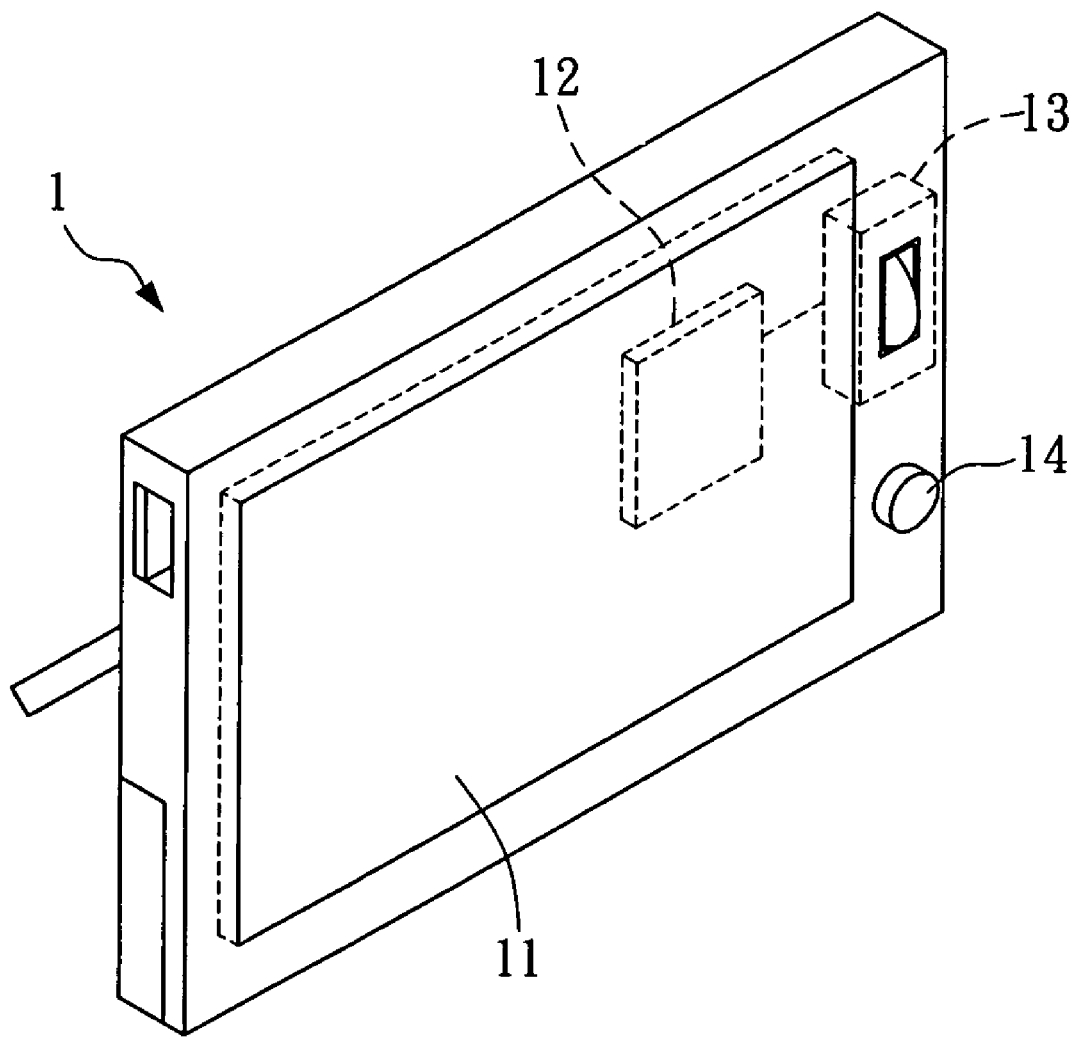
FIG. 1 is a schematic, perspective view of an image processing apparatus according to a first preferred embodiment of the present invention.

Referring to FIG. 1, which is a schematic, perspective view of an image processing apparatus 1 according to a first preferred embodiment of the present invention. The image processing apparatus 1 is a digital frame comprising a display module 11, a control module 12, a scroll wheel module 13 and a function key 14. The display module 11 is provided at a predetermined location on the image processing apparatus 1 for displaying a digital image. The display module 11 can be a liquid crystal display (LCD) device. The control module 12 is connected to the display module 11 for controlling the display module 11 and conducting image processing. The function key 14 can be a power switch or a key activating a specific function to be operated by a user.

Figure 2:
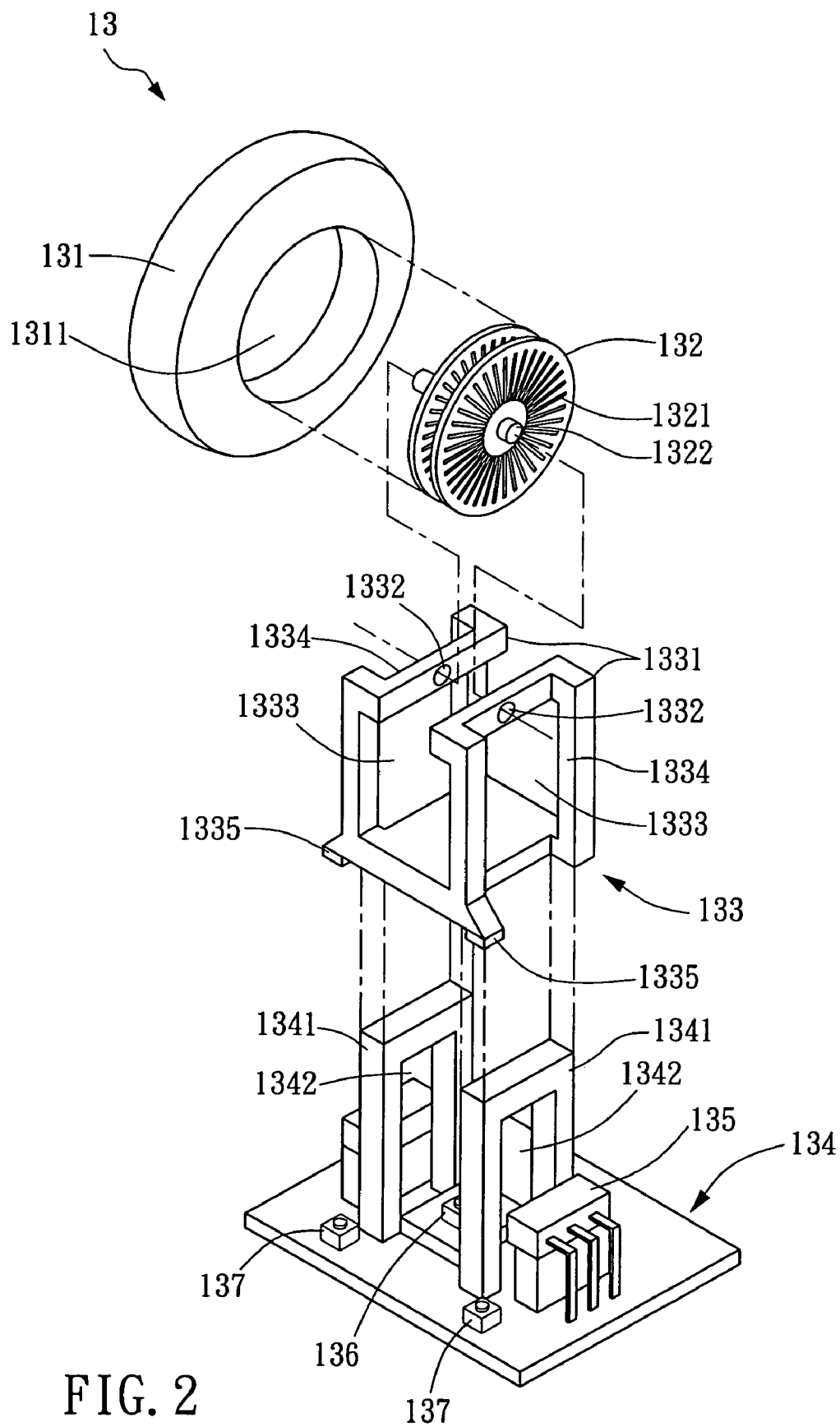
FIG. 2 is a schematic, perspective view of a scroll wheel module of the image processing apparatus according to the first preferred embodiment of the present invention.

FIG. 2 is a schematic, perspective view of the scroll wheel module 13 of the image processing apparatus 1 according to the first preferred embodiment of the present invention. The scroll wheel module 13 is connected to the control module 12 and can be operated to generate at least one control signal for controlling the control module 13. The scroll wheel module 13 comprises a scroll wheel 131, an optical grating 132, a frame 133, a base 134, sensing elements 135, a first touch switch 136 and second touch switches 137.

The scroll wheel 131 is a hollow wheel-shaped component having a central portion 1311 where the optical grating 132 is located. The optical grating 132 is coaxial with the scroll wheel 131 while having a plurality of wheel-shaped arrays of light-transmitting slots 1321 and a central shaft 1322 extending from a center of each of two sides of the optical grating 132.

The frame 133 is a U-shaped frame comprising a support 1331 on each of two lateral sides thereof, wherein each of the supports 1331 has an upper portion formed with a bearing 1332 for pivotally connecting with a corresponding one of the central shafts 1322 extending respectively from the two sides of the optical grating 132, so that the scroll wheel 131 can be pivotally connected to the supports 1331. Further, the two supports 1331 formed respectively on the two lateral sides of the frame 133 are each provided with a hollow portion 1333 which allows the light-transmitting slots 1321 on the optical grating 132 to show through the hollow portion 1333. Each of the supports 1331 is further provided on an outer lateral side thereof with a sliding groove 1334 and a protrusion 1335.

The base 134 is located under the frame 133 and vertically provided with two opposite sliding rails 1341, each formed with a hollow section 1342. When the two sliding rails 1341 on the base 134 are inserted into the corresponding sliding grooves 1334 on the frame 133, the light-transmitting slots 1321 exposed through the hollow portions 1333 also show through the hollow sections 1342 of the base 134, so that the sensing elements 135 located outside the two sliding rails 1341 of the base 134 are facing the optical grating 132 in the scroll wheel 131 through the hollow sliding rails 1341 and supports 1331. The sensing elements 135 can detect via the light-transmitting slots 1321 a spin-momentum corresponding to a forward rotation or a backward rotation of the scroll wheel 131, while the control module 12 controls a displaying of the display module 11. Because the technique used by the sensing elements 135 to detect the spin-momentums of the optical grating 132 can be carried out by using conventional light-sensing devices available on the market and does not constitute a major technical feature of the present invention, a detailed description thereof is omitted herein.

The first touch switch 136 is provided on an elevated platform (not labeled in the drawing) of the base 134 at an appropriate location between the two sliding rails 1341. The first touch switch 136 is located on the elevated platform so as to be closer to a bottom portion of the frame 133 and can therefore be more easily pressed and triggered by the bottom portion of the frame 133. The second touch switches 137 are located generally under the frame 133 on two lateral sides of the first touch switch 136, respectively, and correspond to the protrusions 1335 formed on the two sides of the frame 133, respectively. Since these touch switches 136 and 137 are commercially available and do not constitute a major technical feature of the present invention, a detailed description thereof is herein omitted.

Figure 3:
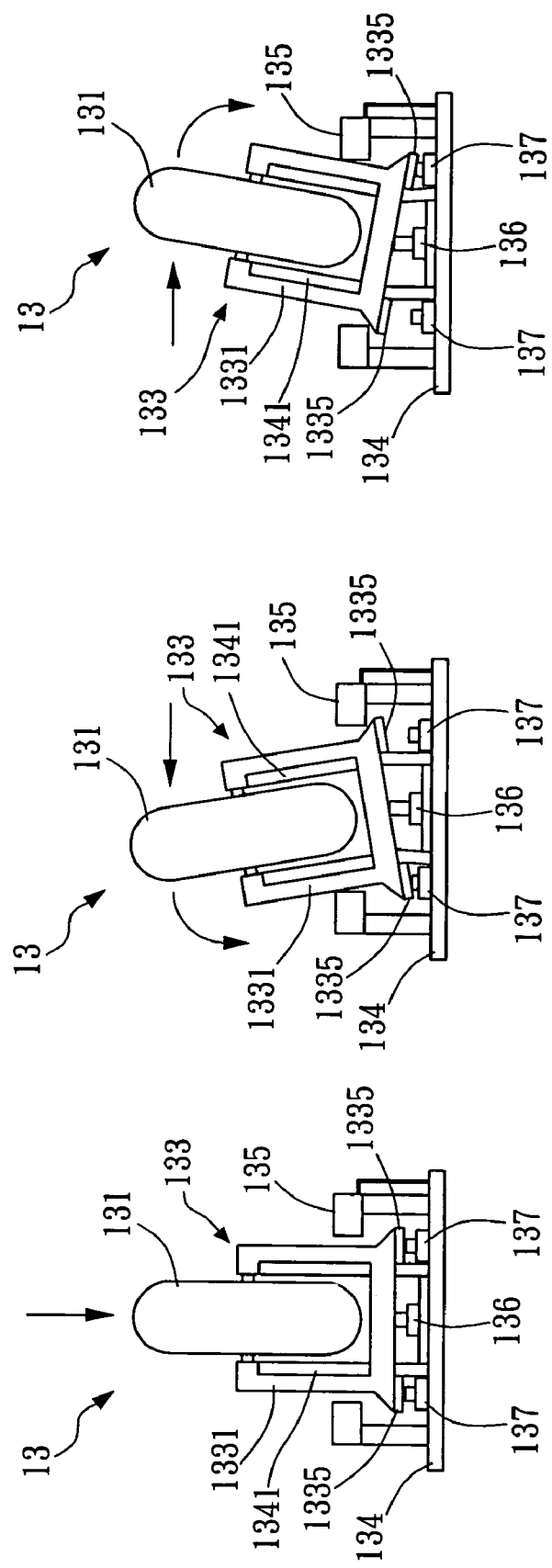
FIG. 3 is a schematic drawing showing operations of the image processing apparatus according to the first preferred embodiment of the present invention.

FIG. 3 is a schematic drawing showing operations of the image processing apparatus according to the first embodiment of the present invention. The scroll wheel 131 can be pressed vertically towards the base 134 so that the sliding grooves 1334 of the frame 133 (referring back to FIG. 2) move linearly along the sliding rails 1341 of the base 134 in a vertical direction. As a result, the bottom portion of the frame 133 touches and thereby triggers the first touch switch 136 on the base 134 to generate a control signal. On the other hand, if a predetermined force is applied to the scroll wheel 131 towards either of the two sides thereof to make the scroll wheel 131 tilt to the left or to the right, then the rigid sliding rails 1341 are forced by the supports 1331 to tilt downwards by a predetermined angle along a direction where the force is applied. Thus, a corresponding one of the protrusions 1335 formed on slanted side edges of the frame 133 touches and triggers a corresponding one of the two second touch switches 137 on the base 134 to generate a different control signal.

Now that the first touch switch 136 on the elevated platform is more easily triggered than the two second touch switches 137, when the user operates the scroll wheel module 13 by pressing the scroll wheel 131 and thereby triggers the first touch switch 136 to generate a control signal, the protrusions 1335 on the frame 133 will not trigger any of the second touch switches 137 on the base 134 at the same time. Similarly, when any one of the two second touch switches 137 is triggered by a corresponding one of the protrusions 1335, the first touch switch 136 will not be triggered at the same time because the frame 133 is only tilted to the left or to the right and is not shifted up and down. Therefore, there will be no interference between control signals.

In this preferred embodiment, the scroll wheel module 13 is a five-direction scroll wheel module which provides at least five operation modes, each in a different direction. In addition, the scroll wheel 131 can be rotated in two directions, i.e., forwards and backwards, with respect to the frame 133 so as to generate two different control signals. Therefore, interactions between the scroll wheel module 13 and the first touch switch 136 and between the scroll wheel module 13 and the two second touch switches 137 allow control in at least five different directions, which correspond to at least five different control signals, each having a different function. Theses control signals are sent to the control module 12 to actuate image processing.

Figure 4:
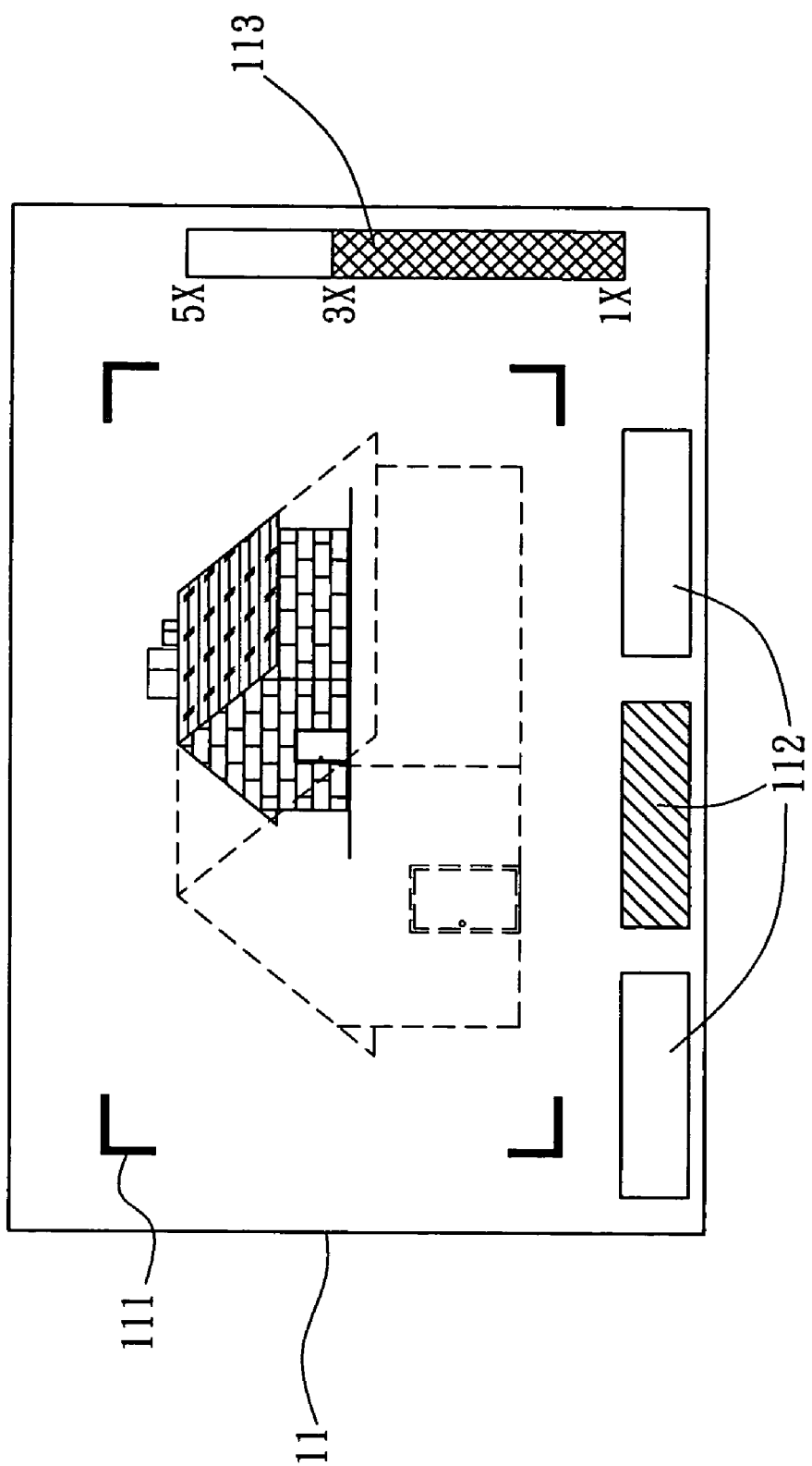
FIG. 4 is a schematic drawing corresponding to an operation of a display module of an image processing apparatus according to a second preferred embodiment of the present invention.
Figure 5:
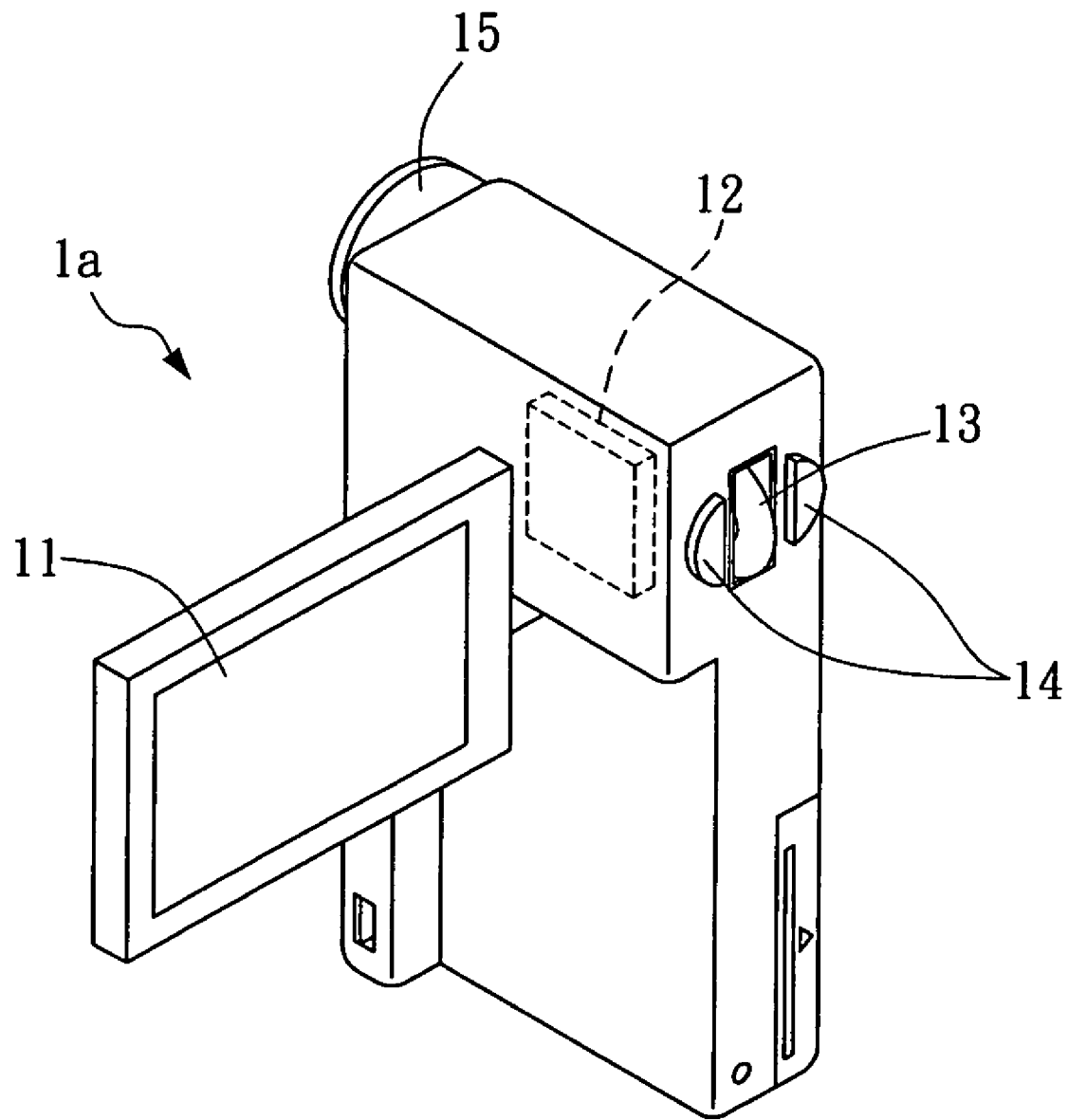
FIG. 5 illustrates the image processing apparatus according to the second preferred embodiment of the present invention.

FIG. 4 is a schematic drawing corresponding to an operation of a display module 11 of an image processing apparatus 1a (as shown in FIG. 5 and described further below) according to a second preferred embodiment of the present invention. The display module 11 of said image processing apparatus further displays a window 111 (such as a display window), a plurality of function menus 112 and a zoom level indicator 113. In this embodiment, the forward and backward rotations of the scroll wheel 131 are used to rapidly zoom in or zoom out object displayed in the window 111, and a current zoom level shown by the zoom level indicator 113 on the display module 11. In contrast to a conventional image processing apparatus which must have more than two additional operation keys to provide the abovementioned function and in which the operation keys must be pressed several times to zoom in or zoom out an image only bit by bit, the present invention provides a simpler and more convenient solution and lowers a complexity of a control panel of the apparatus.

In addition, the plurality of function menus 112 on the display module 11 can be further controlled by applying a predetermined force to the scroll wheel 131 towards either of the two sides thereof so that the scroll wheel 131 tilts to the left or to the right. Each of the function menus 112 can be selected by moving a highlighted bar towards the left or to the right, so as to enter a specific function menu 112, in which a variety of recording parameters, such as "record", "replay", "stop", "select", "zoom in/zoom out" and "fast forward/fast rewind", can be selected and set with the scroll wheel module 13. When the scroll wheel 131 of the scroll wheel module 13 is pressed and thereby triggers the first touch switch 136, a confirming function is immediately performed. This further simplifies the control panel of the image processing apparatus and reduces the volume of the apparatus. Compared with a conventional image processing apparatus wherein each single function is selected by using a different key, the present invention is much simpler while greatly reducing material and assembly cost.

FIG. 5 is the image processing apparatus 1a according to the second preferred embodiment of the present invention. The image processing apparatus 1a is a digital video (DV) camera comprising the display module 11, the control module 12, the scroll wheel module 13, the function key 14 and a camera module 15, wherein the camera module 15 is connected to the control module 12 for recording an exterior image, which is then displayed on the display module 11. The camera module 15 can be used to record sound and moving pictures as well as still images. The scroll wheel module 13 provides at least five operation modes, each in a different direction, so as to generate different control signals for activating different functions of the camera module 15. Thus, the number of function keys can be reduced.

Figure 6:
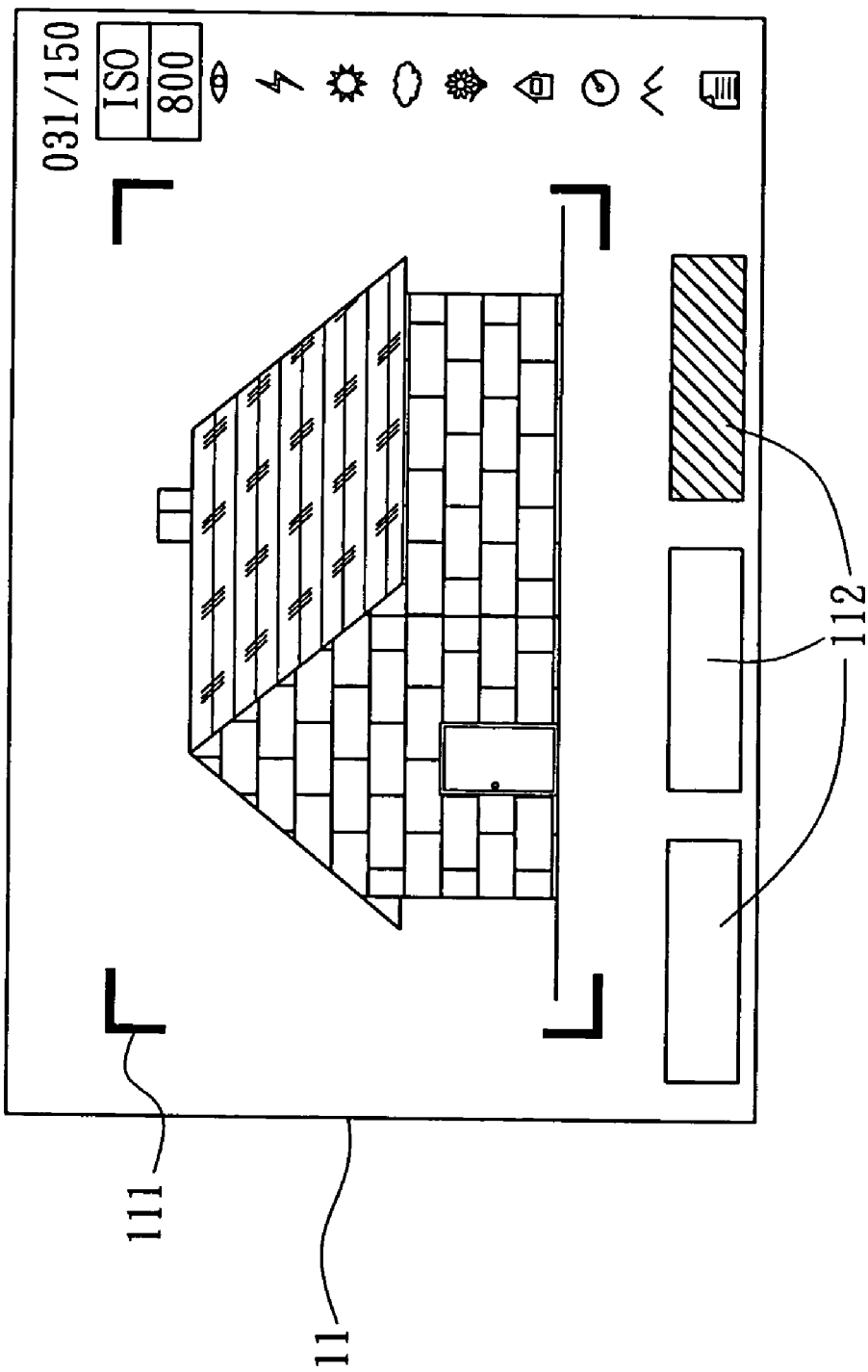
FIG. 6 is a schematic drawing corresponding to another operation of the display module of the image processing apparatus according to the second preferred embodiment of the present invention.

Referring to FIG. 6, which is a schematic drawing corresponding to another operation of the display module 11 of the image processing apparatus 1a according to the second preferred embodiment of the present invention. The display module 11 further displays a window 111 (such as a viewfinder) and a plurality of function menus 112. The window 111 frames therein an image of an object to be recorded while a forward and backward rotation of the scroll wheel 131 can be used to rapidly zoom in or zoom out (i.e., zoom level in photography) of the image of the object in the window 111. Unlike a conventional image processing apparatus which must have two additional operation keys in opposite directions to allow selection of the recording parameters, the present invention provides a much simpler approach, downsizes the apparatus and cuts production cost.

The plurality of function menus 112 on the display module 11 can be further controlled and switched by tilting the scroll wheel module 13 to the left or to the right so as to trigger a corresponding one of the two second touch switches 137. Each of the different function menus 112 can be selected by moving a highlighted bar towards the left or to the right, so as to enter a specific function menu 112, in which a variety of recording parameters, such as flashlight switch, red eye removal, timed recording, recording type, image resolution, white balance and ISO value, can be fine-tuned and set. When the scroll wheel 131 is vertically pressed and thereby triggers the first touch switch 136, a function of confirming a command is immediately performed. After the function menu 112 is closed and the image processing apparatus 1a is ready to record, the first touch switch 136 to be triggered by the scroll wheel 131 can be designed to generate a control signal for being sent to the control module 12 and thereby activating recording.

In summary, an image processing apparatus 1 disclosed herein comprises a display module 11, a control module 12, a scroll wheel module 13 and a function key 14. The display module 11 is used to display a digital image. The display module 11 can also display a window 111, a plurality of function menus 112 and a zoom level indicator 113. The control module 12 is connected to the display module 11 so as to control the display module 11 and conduct image processing. The scroll wheel module 13 is connected to the control module 12 and provides five operation modes, each in a different direction, so as to generate at least five control signals, each having a different function. In addition, a user can use the function menus 112 and the zoom level indicator 113 on the display module 11 to operate the image processing apparatus 1, thereby controlling the control module 12 to perform image processing.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An image processing apparatus, comprising:
   a display module for displaying a digital image;
   a control module, connected to the display module for controlling the display module and conducting image processing; and
   a five-direction scroll wheel module, connected to the control module for being operated to generate at least five control signals for controlling the control module, the scroll wheel module further comprising:
   a scroll wheel, which is a hollow wheel-shaped component;
   an optical grating, having a plurality of wheel-shaped arrays of light-transmitting slots and located coaxially with the scroll wheel at a central portion thereof;
   a frame, which is a U-shaped frame and provided with a hollow support on each of two lateral sides thereof for pivotally connecting with the optical grating, wherein each of two outer lateral sides thereof is provided with a sliding groove and a protrusion;
   a base, located under the frame and vertically provided with two opposite, hollow sliding rails which can be inserted into the sliding grooves;
   a sensing element, located outside each of the two sliding rails of the base and facing the optical grating in the scroll wheel through the hollow sliding rails and the hollow supports, wherein the sensing elements can detect a spin-momentum of a forward or backward rotation of the scroll wheel via the light-transmitting slots;
   a first touch switch, located on the base between the two sliding rails; and
   two second touch switches, located on two lateral sides of the first touch switch, respectively, and corresponding to the protrusions on the two lateral sides of the base, respectively;
   wherein the scroll wheel can be pressed vertically towards the base, so that a bottom portion of the frame touches and thereby triggers the first touch switch on the base; and when a predetermined force is applied to the scroll wheel towards either of two sides thereof, the sliding rails tilt downwards towards a direction in which the force is applied so as to cause a corresponding one of the protrusions formed on the frame to touch and thereby trigger a corresponding one of the two second touch switches on the base.

2. The image processing apparatus as claimed in claim 1, wherein the scroll wheel module provides at least five operation modes, each in a different direction; while a forward rotation and a backward rotation of the scroll wheel, the first touch switch and the two second touch switches correspond to at least five control signals, respectively, each having a different function, in which the control signals are sent to the control module to actuate image processing.

3. The image processing apparatus as claimed in claim 1, wherein the image processing apparatus is a digital video camera and further comprises a camera module connected to the control module for recording an external image.

4. The image processing apparatus as claimed in claim 3, wherein the forward and backward rotations of the scroll wheel are detected by the sensing elements to generate two different control signals for adjusting a zoom level for image recording; the two second touch switches can be triggered by tilting the scroll wheel module to the left and to the right so as to control and switch a plurality of function menus; and a function of confirming a command is immediately performed when the scroll wheel is vertically pressed to trigger the first touch switch.

5. The image processing apparatus as claimed in claim 1, wherein the image processing apparatus is a digital frame and the display module is a liquid crystal display (LCD) device.

6. The image processing apparatus as claimed in claim 5, wherein the forward and backward rotations of the scroll wheel are detected by the sensing elements so as to generate two different control signals for zooming in or zooming out an image of an object displayed in a window on the display module; the two second touch switches can be triggered by tilting the scroll wheel module to the left and to the right so as to control and switch a plurality of function menus; and a function of confirming a command is immediately performed when the scroll wheel is vertically pressed to trigger the first touch switch.

7. An image processing apparatus, comprising:
   a display module for displaying a digital image;
   a control module, connected to the display module for controlling the display module and conducting image processing; and a scroll wheel module, connected to the control module for providing a plurality of control signals to the control module;
wherein the scroll wheel module further comprises:
a base, provided with two upwardly extending sliding rails;
a frame, comprising an upwardly extending support and a downward protrusion on each of two lateral sides thereof, wherein the two supports can receive the two sliding rails and slide up and down along the two sliding rails;
a scroll wheel, pivotally connected to the two supports in a rotatable manner and having an optical grating installed at a central portion of the scroll wheel;
a sensing element, located on the base and corresponding to the optical grating, for detecting two spin-momentums corresponding to a forward rotation and a backward rotation of the scroll wheel, respectively;
a first touch switch, located on the base and corresponding to a bottom portion of the frame, so that the first touch switch can be triggered when the frame slides downwards; and
two second touch switches, located on the base and corresponding to the two protrusions, respectively, so that one of the two protrusions provided on the two lateral sides of the frame can touch and thereby trigger a corresponding said second touch switch by tilting the scroll wheel to the left or to the right.

8. The image processing apparatus as claimed in claim 7, wherein the scroll wheel is a hollow wheel-shaped component; the optical grating has a plurality of wheel-shaped arrays of light-transmitting slots and is located coaxially with the scroll wheel at the central portion thereof; the frame is a U-shaped frame in which the supports on the two lateral sides thereof each have a hollow portion and each of the supports is further provided on an outer lateral side thereof with a hollow sliding groove, so that the two sliding rails on the base can be inserted into the corresponding sliding grooves; and the sensing element is located outside the sliding rails and facing the optical grating installed at the central portion of the scroll wheel through the hollow sliding grooves so as to detect the spin-momentums of the scroll wheel via the light-transmitting slots.

9. The image processing apparatus as claimed in claim 7, wherein the image processing apparatus is a digital video camera and further comprises a camera module connected to the control module for recording an external image.

10. The image processing apparatus as claimed in claim 9, wherein the forward and backward rotations of the scroll wheel are detected by the sensing elements to generate two different control signals for adjusting a zoom level for image recording; the two second touch switches can be triggered by tilting the scroll wheel module to the left and to the right so as to control and switch a plurality of function menus; and a function of confirming a command is immediately performed when the scroll wheel is vertically pressed to trigger the first touch switch.

11. The image processing apparatus as claimed in claim 7, wherein the image processing apparatus is a digital frame and the display module is a liquid crystal display (LCD) device.

12. The image processing apparatus as claimed in claim 11, wherein the forward and backward rotations of the scroll wheel are detected by the sensing elements so as to generate two different control signals for zooming in or zooming out an image of an object displayed in a window on the display module; the two second touch switches can be triggered by tilting the scroll wheel module to the left and to the right so as to control and switch a plurality of function menus; and a function of confirming a command is immediately performed when the scroll wheel is vertically pressed to trigger the first touch switch.

* * * * *